US008126633B2

(12) United States Patent
De Fazio et al.

(10) Patent No.: US 8,126,633 B2
(45) Date of Patent: Feb. 28, 2012

(54) METHOD FOR OPERATING AN INTERNAL COMBUSTION ENGINE

(75) Inventors: Tommaso De Fazio, Bologna (IT); Giovanni Rovatti, Chieri (IT)

(73) Assignee: GM Global Technology Operations LLC, Detroit, MI (US)

( * ) Notice: Subject to any disclaimer, the term of this patent is extended or adjusted under 35 U.S.C. 154(b) by 127 days.

(21) Appl. No.: 12/397,053

(22) Filed: Mar. 3, 2009

(65) Prior Publication Data

US 2009/0228188 A1 Sep. 10, 2009

(30) Foreign Application Priority Data

Mar. 4, 2008 (EP) .................................... 08003963

(51) Int. Cl.
*B60T 7/12* (2006.01)
*F02M 51/00* (2006.01)

(52) U.S. Cl. ......... 701/103; 701/106; 123/486; 123/674

(58) Field of Classification Search .................. 701/103, 701/104, 106, 114, 115; 123/357, 478, 480, 123/486, 673, 674, 679, 681, 687
See application file for complete search history.

(56) References Cited

U.S. PATENT DOCUMENTS 5,293,853 A * 3/1994 Berger et al. ................ 123/357
(Continued)

FOREIGN PATENT DOCUMENTS

DE 3943207 A1 7/1990
(Continued)

OTHER PUBLICATIONS

European Patent Office, European Search Report for European Application No. 08003963.9, Jul. 3, 2008.

(Continued)

*Primary Examiner* — John T Kwon
(74) *Attorney, Agent, or Firm* — Ingrassia Fisher & Lorenz, P.C.

(57) ABSTRACT

A method for operating an internal combustion engine is provided and at least a first map of prefixed first values is predetermined, each prefixed first value being a function of a prefixed nominal fuel quantity ($Q_{ecu\_prefix}$). The method includes, but is not limited to the steps of determining a nominal fuel quantity ($Q_{ecu}$) for one injection, calculating an actual, torque forming, injected fuel quantity of the injection ($Q_{UEGO}$) and calculating at least one first parameter ($Q_{delta}$) which is related to the actual, torque forming, injected fuel quantity of the injection ($Q_{UEGO}$). After that, the nominal fuel quantity ($Q_{ecu}$) is modified according to the value of the at least one first parameter ($Q_{delta}$) so as to obtain a corrected fuel quantity ($Q_{ecuCorr}$) that corresponds to the actual fuel quantity injected during the injection. The method further includes, but not limited to the step of comparing the corrected fuel quantity ($Q_{ecuCorr}$) with each of the prefixed nominal fuel quantity ($Q_{ecu\_prefix}$) and operating the engine using, from the first map, the first values which corresponds to the corrected fuel quantity ($Q_{ecuCorr}$), according to the result of said comparison.

4 Claims, 1 Drawing Sheet

U.S. PATENT DOCUMENTS

| | | | | |
|---|---|---|---|---|
| 6,360,733 | B1 * | 3/2002 | Uberti Bona Blotto et al. | 123/674 |
| 6,779,511 | B2 * | 8/2004 | Tonetti et al. | 123/480 |
| 6,792,901 | B2 * | 9/2004 | Sugiyama et al. | 123/90.15 |
| 7,025,043 | B2 * | 4/2006 | Tonetti et al. | 123/436 |
| 7,044,118 | B2 | 5/2006 | Tonetti et al. | |
| 2002/0189602 | A1 * | 12/2002 | Sugiyama et al. | 123/673 |
| 2006/0260592 | A1 | 11/2006 | Roesel et al. | |
| 2008/0087259 | A1 | 4/2008 | Kato et al. | |
| 2009/0038589 | A1 * | 2/2009 | Dingle | 123/480 |

FOREIGN PATENT DOCUMENTS

| | | | |
|---|---|---|---|
| DE | 19831748 | A1 | 1/2000 |
| EP | 1336745 | A2 | 8/2003 |
| FR | 2861427 | A1 | 4/2005 |

OTHER PUBLICATIONS

English Patent Office, English Search Report for English Application No. GB 0903162.6, Jun. 5, 2009.

* cited by examiner

METHOD FOR OPERATING AN INTERNAL COMBUSTION ENGINE

CROSS-REFERENCE TO RELATED APPLICATION

This application claims priority to European Patent Application No. 08003963.9-1263, filed Mar. 4, 2008, which is incorporated herein by reference in its entirety.

TECHNICAL FIELD

The present invention relates to internal combustion engines and fuel injection systems. More specifically, the invention relates to a method for operating an internal combustion engine.

BACKGROUND

Fuel injection control systems and methods for internal combustion engines are well-known in the art, for instance from EP-1 336 745 B1.

In conventional internal combustion engines, the quantity of fuel actually injected into each cylinder and at each injection may be different from the nominal fuel quantity requested by the electronic control unit (ECU) and which is used to determine the energization time of the injectors.

There are several factors which contribute to this difference, particularly the dispersion of the injectors' characteristics, due to the production process spread, and the time-drift variations of the same characteristics, due to aging of the injection system. In fact, the current injector production processes are not accurate enough to produce injectors with tight tolerances; moreover, these tolerances become worse with aging during the injector life-time. As a result, for a given energization time and a given rail pressure, the quantity of fuel actually injected may be different from one injector to another.

The control unit contains exhaust emission relevant maps in which different engine parameters (i.e., set points) are related to the nominal injected fuel quantity and the nominal engine speed. Examples of such set points are the amount of exhaust gas recirculation, the boost pressure, the rail pressure, the throttle valve position. When a difference between the actually injected fuel quantity and the nominal fuel quantity occurs, an incorrect value of this quantity is used to read the emission maps (i.e., that is an incorrect value of said set points is associated to the actually injected fuel quantity), and this results in emission worsening.

In view of the above, it is at least one object of the present invention to provide an improved method for operating an internal combustion engine to recover the injectors' drifts. In addition, other objects, desirable features, and characteristics will become apparent from the subsequent summary and detailed description, and the appended claims, taken in conjunction with the accompanying drawings and this background.

SUMMARY

Further characteristics and advantages of the invention will become apparent from the following description, provided merely by way of non-limiting example, with reference to the accompanying drawing in which FIG. 1 is a block diagram of the operations performed according to the method of the invention.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
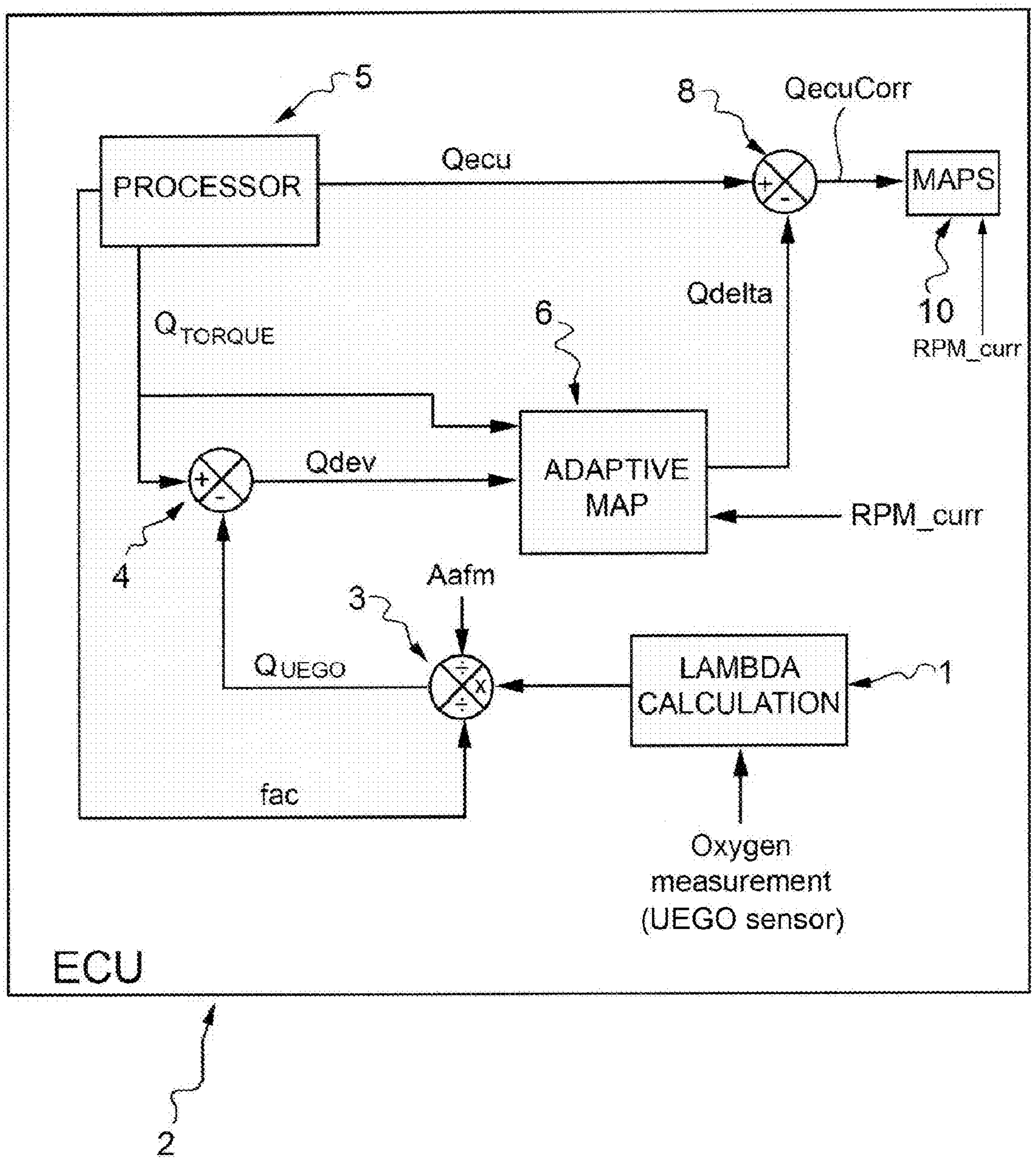
FIG. 1 shows a block diagram of the operations performed according to an embodiment of the method of the invention.

The following detailed description is merely exemplary in nature and is not intended to limit application and uses. Furthermore, there is no intention to be bound by any theory presented in the preceding background or summary or the following detailed description.

The method comprises the step of measuring the oxygen volume concentration in the exhaust gas flow through a UEGO (Universal Exhaust Gas Oxygen) sensor placed in the exhaust line of the engine. The UEGO sensor has an analog output proportional to the oxygen percentage in the exhaust gas.

Then, the air to fuel ratio (λ or lambda) of the combustion is determined in a first block 1 of an electronic control unit ECU 2, based on the oxygen volume concentration measured by the UEGO sensor.

A second block 3 calculates the actual, torque forming, injected fuel quantity $Q_{UEGO}$ according to the following equation:

$$Q_{UEGO} = \frac{A_{afm}}{\lambda * fac}$$

where $A_{afm}$ is the air mass measured by an air mass sensor and "fac" is a constant calculated by a microprocessor 5 of the ECU 2 according to the following equation:

$$fac = \left(\frac{A}{F}\right)_{st} \rho$$

where ρ is the fuel density and $(A/F)_{st}$ is the stoichiometric air to fuel ratio.

A third block 4 represents the calculation of an intermediate value $Q_{dev}$ of fuel quantity as the difference between a nominal, torque forming, fuel quantity $Q_{TORQUE}$ estimated by the microprocessor 5 and the actual, torque forming, injected fuel quantity $Q_{UEGO}$.

In the ECU 2 there is stored an adaptive map 6 in which a set of reference correction values are stored, each reference correction value corresponding to a predetermined corresponding couple of values of prefixed engine speed $RPM_{\_prefix}$ and prefixed, torque forming, fuel quantity $Q_{TORQUE\_prefix}$ estimated by the microprocessor 5.

The intermediate value $Q_{dev}$ is used to update the adaptive map 6 to modify the reference correction values: the original values of said reference correction values are combined in a predetermined manner with the intermediate value $Q_{dev}$, according to a low pass filtering logic.

In the operation, from the adaptive map 6 a correction value $Q_{delta}$ is obtained, depending on a current engine speed $RPM_{\_curr}$ measured by a sensor and the nominal, torque forming, fuel quantity $Q_{TORQUE}$: the correction value $Q_{delta}$ may be the closest fitting reference correction value stored in said adaptive map 6, or may be obtained by interpolation between stored reference correction values when the current engine speed $RPM_{curr}$ and the nominal, torque forming, fuel quantity $Q_{TORQUE}$ do not exactly correspond to one of the predetermined couple of values of prefixed engine speed $RPM_{prefix}$ and prefixed, torque forming, fuel quantity $Q_{TORQUE\_prefix}$ stored in the adaptive map 6.

In a fourth calculation block 8, the correction value $Q_{delta}$ is subtracted from a nominal fuel quantity $Q_{ecu}$ estimated by the microprocessor 5. The nominal fuel quantity $Q_{ecu}$ basically corresponds to the nominal, torque forming, fuel quantity $Q_{TORQUE}$: the first is a mathematical revision of the second.

Thanks to the subtraction, a corrected fuel quantity $Q_{ecuCorr}$ representative of the actually injected fuel quantity is obtained.

Maps 10, stored in the ECU 2, contain a plurality of prefixed values (setpoints) of different engine parameters, each value being a function of prefixed nominal fuel quantity $Q_{ecu\_prefix}$ and prefixed engine speed $RPM_{prefix}$. Examples of such parameters are the amount of exhaust gas recirculation, the boost pressure, the rail pressure, the throttle valve position, the swirl valve position.

In the operation, from the maps 10 the setpoints which correspond to the current engine speed $RPM_{curr}$ and the corrected fuel quantity $Q_{ecuCorr}$ are read end used to operate the engine. In this way, there is not any direct effect on the actual injected fuel quantity: the injected fuel quantity is not modified.

The invention allows to improve the control accuracy of the injection and is applicable in both Diesel and gasoline engines.

Clearly, the principle of the invention remaining the same, the embodiments and the details of production can be varied considerably from what has been described and illustrated purely by way of non-limiting example, without departing from the scope of protection of the present invention as defined by the attached claims. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for operating an internal combustion engine, with at least a first map of prefixed first values is predetermined, each prefixed first value being a function of a prefixed nominal fuel quantity ($Q_{ecu\_prefix}$), the method comprising the steps of:

- determining a nominal fuel quantity ($Q_{ecu}$) for an injection ($Q_{UEGO}$);
- calculating an actual, torque forming, injected fuel quantity of said injection ($Q_{UEGO}$), wherein said actual, torque forming, injected fuel quanity ($Q_{UEGO}$) is calculated according to a following equations $$Q_{UEGO} = \frac{A_{afm}}{\lambda * fac}$$

where $A_{afm}$ is an air mass measured by an air mass sensor, $\lambda$ is an air to fuel ratio and "fac" is a predetermined constant provided by the equation:

$$fac = \left(\frac{A}{F}\right)_{st} \rho$$

where $\rho$ is a fuel density and $(A/F)_{st}$ is a stoichiometric air to fuel ratio;

- calculating an at least one first parameter ($Q_{delta}$) which is related to the actual, torque forming, injected fuel quantity of said injection ($Q_{UEGO}$);
- modifying said nominal fuel quantity ($Q_{ecu}$) according to said at least one first parameter ($Q_{delta}$) so as to obtain a corrected fuel quantity ($Q_{ecuCorr}$) that corresponds to an actual fuel quantity injected during said injection ($Q_{UEGO}$);
- comparing said corrected fuel quantity ($Q_{ecuCorr}$) with each of said prefixed nominal fuel quantity ($Q_{ecu\_prefix}$);
- operating the internal combustion engine using, from the first map, the first values which correspond to said corrected fuel quantity ($Q_{ecuCorr}$), according to a result of said comparing said corrected fuel quantity ($Q_{ecuCorr}$) with each of said prefixed nominal fuel quantity ($Q_{ecu\_prefix}$).

2. The method of claim 1, in which calculation of said at least one first parameter ($Q_{delta}$) comprises the steps of:

- determining a nominal, torque forming, fuel quantity ($Q_{TORQUE}$) for one injection;
- defining a second map containing a set of reference correction values each corresponding to a couple of prefixed engine speed ($RPM_{prefix}$) and prefixed, torque forming, fuel quantity ($Q_{TORQU\_prefix}$);
- determining a current engine speed ($RPM_{curr}$);
- calculating an intermediate value ($Q_{dev}$) which is related to the actual, torque forming, injected fuel quantity of the injection ($Q_{UEGO}$);
- modifying reference correction values as a function of said intermediate value ($Q_{dev}$);
- comparing said prefixed engine speed ($RPM_{prefix}$) and prefixed, torque forming, fuel quantity ($Q_{TORQUE\_prefix}$) with the current engine speed ($RPM_{curr}$) and the nominal, torque forming, injected fuel quantity of the injection ($Q_{UEGO}$);
- calculating said at least one first parameter ($Q_{delta}$) as a function of said reference correction values according to the result of said comparing said prefixed engine speed ($RPM_{prefix}$) and prefixed, torque forming, fuel quantity ($Q_{TORQUE\_prefix}$) with the current engine speed ($RPM_{curr}$) and the nominal, torque forming, injected fuel quantity of the injection ($Q_{UEGO}$).

3. The method of claim 2, in which the intermediate value ($Q_{dev}$) is obtained as difference between said nominal, torque forming, fuel quantity ($Q_{TORQUE}$) and the actual, torque forming, injected fuel quantity ($Q_{UEGO}$).

4. A method for operating an internal combustion engine, with at least a first map of prefixed first values is predetermined, each prefixed first value being a function of a prefixed nominal fuel quantity ($Q_{ecu}$_prefix), the method comprising the steps of:

determining a nominal fuel quantity ($Q_{ecu}$) for an injection ($Q_{UEGO}$);

calculating an actual, torque forming, injected fuel quantity of said injection ($Q_{UEGO}$), wherein said actual, torque forming, injected fuel quantity ($Q_{UEGO}$) is calculated according to a following equations $$Q_{UEGO} = \frac{A_{afm}}{\lambda * fac}$$

where $A_{afm}$ is an air mass measured by an air mass sensor, $\lambda$ is an air to fuel ratio and "fac" is a predetermined constant.

* * * * *